(No Model.)
C. F. WINKLER.
SECONDARY BATTERY ELECTRODE.
No. 471,591. Patented Mar. 29, 1892.
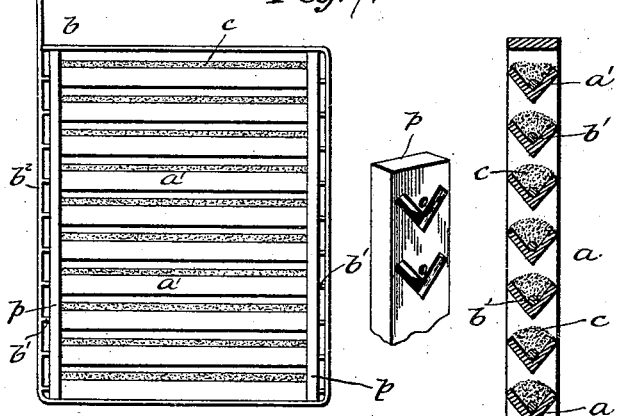
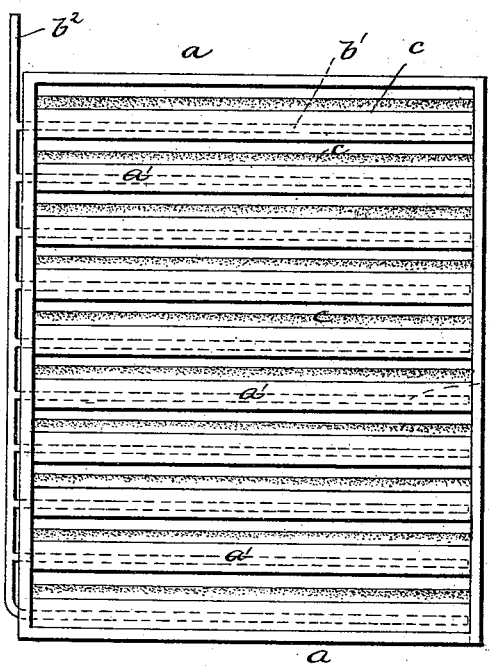
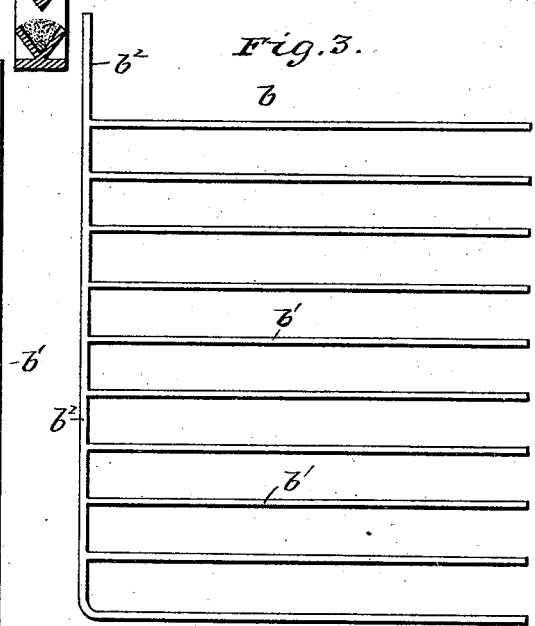
WITNESSES:
Frank S. Ober
Edward R. Wagner
INVENTOR
Charles F. Winkler
BY
ATTORNEY.

UNITED STATES PATENT OFFICE.

CHARLES F. WINKLER, OF TROY, NEW YORK.

SECONDARY-BATTERY ELECTRODE.

SPECIFICATION forming part of Letters Patent No. 471,591, dated March 29, 1892.

Application filed June 26, 1891. Serial No. 397,562. (No model.)

*To all whom it may concern:*

Be it known that I, CHARLES F. WINKLER, a citizen of the United States, residing in Troy, in the county of Rensselaer and State of New York, have invented certain new and useful Improvements in Secondary Batteries, of which the following is a specification.

This invention relates to secondary or storage electric batteries, and has for its object the production of a battery which shall be light, durable, and efficient.

In general the invention consists of an electrode composed of a series of troughs made of insulating material, each of said troughs carrying active material in which is embedded a good conductor of electricity, all of said conductors being connected together.

In the accompanying drawings, Figure 1 represents a transverse vertical section of my battery-electrode. Fig. 2 represents a side elevation of the same; Fig. 3, a side elevation of the conducting portion of the electrode, and Fig. 4 shows a modification of the construction.

Referring to the drawings by letter, $a$ represents a frame of hard rubber, celluloid, fiber, or other suitable insulating material. This frame is of general rectangular shape and supports between two of its opposite sides a series of troughs $a'$, arranged one above the other and formed of insulating material, preferably of the same kind as the frame.

$b$ represents the conducting portion of the plate. It consists of a series of lead wires or rods $b'$ $b'$, &c., arranged parallel to each other and in a vertical plane connected together at one end by a rod $b^2$ of the same metal. The space between the rods $b'$ $b'$ is about equal to the distance between the troughs $a'$. When the part $b$ is applied to the plate, the rods $b'$ $b'$, &c., are located, respectively, in the troughs $a'$ and extend throughout their length. One of the side pieces of the frame $a$ is provided with a series of perforations opposite each trough through which the rods $b'$ $b'$ pass. The vertical rod $b^2$ remains on the outside of the plate, as shown in Fig. 2, and extends beyond the upper edge of the plate to form a connecting-lug. After the part $b$ is adjusted to the plate each trough $a'$ is filled with the active material $c$, which is heaped up thereon and buries the rods $b'$. I prefer to leave a space between the upper surface of the active material and the bottom of the trough above to facilitate the circulation of the solution. If desired, the rods $b'$ may be triangular in shape to fit the bottom of the trough, or they may have any other shape desired, the primary idea being that the troughs contain electric conductors buried in the active material.

It will be observed that by constructing the principal portion of the plate of one of the non-conducting materials mentioned I produce a very light plate. Next I provide for the exposure of a large surface of the active material to the solution, and at the same time I secure ample contact between the metallic conductors and the active material.

In Fig. 4 the troughs are made all separate and the ends adjusted to V-shaped openings in two side strips $p$ $p$. The metallic conductor then passes around the edge of the plate and secures the whole structure together.

It is to be understood that my invention is not limited to any particular manner of constructing the plate, the main idea being that I utilize a supporting element of insulating material which carries the active material and also the electric conductor in contact with the active material.

Having thus described my invention, I claim—

1. A secondary-battery electrode consisting of a non-conductive supporting element in the form of a series of troughs or shelves, in combination with active material and electrical conductors supported by said troughs or shelves, substantially as described.

2. A secondary-battery electrode consisting of a series of troughs made of insulating material, in combination with electric conductors and active material located in said troughs.

3. A secondary-battery electrode consisting of a series of troughs made of insulating material, in combination with active material contained in said troughs and conductors of electricity buried in said active material.

4. A secondary-battery electrode consisting of a series of troughs made of insulating material, in combination with active material contained in said troughs and conductors of electricity buried in said active material, all of said conductors being connected together to form a connecting-lug of the plate.

5. A secondary-battery electrode consisting of a rectangular frame supporting a series of troughs, said frame and trough being made of insulating material, in combination with a series of rods of conducting material extending through the side of said frame and lying in the respective troughs, the ends of the rods being connected together by a single rod of conducting material and active material also located in said trough, substantially as described.

In witness whereof I have hereunto signed my name in the presence of two subscribing witnesses.

CHARLES F. WINKLER.

Witnesses:
FRANK S. OBER,
EDWARD A. WAGNER.